United States Patent
Nishikawa et al.

(10) Patent No.: US 12,532,872 B2
(45) Date of Patent: Jan. 27, 2026

(54) FISH COUNT CALCULATION METHOD, FISH COUNT CALCULATION PROGRAM, AND FISH COUNT CALCULATION DEVICE

(71) Applicant: JAPAN AGENCY FOR MARINE-EARTH SCIENCE AND TECHNOLOGY, Kanagawa (JP)

(72) Inventors: Haruka Nishikawa, Kanagawa (JP); Yoichi Ishikawa, Kanagawa (JP); Tatsu Kuwatani, Kanagawa (JP); Daisuke Matsuoka, Kanagawa (JP); Daisuke Sugiyama, Kanagawa (JP); Yoshitaka Watanabe, Kanagawa (JP)

(73) Assignee: JAPAN AGENCY FOR MARINE-EARTH SCIENCE AND TECHNOLOGY, Kanagawa (JP)

( * ) Notice: Subject to any disclaimer, the term of this patent is extended or adjusted under 35 U.S.C. 154(b) by 392 days.

(21) Appl. No.: 18/031,222

(22) PCT Filed: Oct. 13, 2021

(86) PCT No.: PCT/JP2021/037884
§ 371 (c)(1),
(2) Date: Apr. 11, 2023

(87) PCT Pub. No.: WO2022/080407
PCT Pub. Date: Apr. 21, 2022

(65) Prior Publication Data
US 2023/0389530 A1 Dec. 7, 2023

(30) Foreign Application Priority Data
Oct. 14, 2020 (JP) .................................. 2020-173549

(51) Int. Cl.
*A01K 61/95* (2017.01)
*G01S 15/96* (2006.01)
*G06T 7/73* (2017.01)

(52) U.S. Cl.
CPC .............. *A01K 61/95* (2017.01); *G01S 15/96* (2013.01); *G06T 7/75* (2017.01); *G06T 2207/20084* (2013.01)

(58) Field of Classification Search
None
See application file for complete search history.

(56) References Cited

U.S. PATENT DOCUMENTS

| 11,089,762 | B1 * | 8/2021 | Kozachenok | ............ G01G 9/00 |
| 2006/0072375 | A1 * | 4/2006 | Nishimori | ............... G01S 15/96 |
| | | | | 367/111 |

(Continued)

FOREIGN PATENT DOCUMENTS

| CN | 108520511 A | * | 9/2018 | ......... G06F 18/2155 |
| CN | 111127411 A | * | 5/2020 | ............. G06T 17/00 |

(Continued)

OTHER PUBLICATIONS

Hirama et al; "Discriminating Fish Species by an Echo Sounder in a Set-Net Using a CNN"; 21st Asia Pacific Symposium on Intelligent and Evolutionary Systems (IES); pp. 112-115. (Year: 2017).*

(Continued)

*Primary Examiner* — David Ometz
(74) *Attorney, Agent, or Firm* — MARSHALL, GERSTEIN & BORUN LLP

(57) ABSTRACT

In the present invention, an estimator for estimating the number of fish present in an underwater space is constructed by means of machine learning using, as teaching data, a plurality of data sets for learning that each include an echo image for learning, the echo image being based on received sound waves reflected by fish when sound waves are transmitted in an underwater space where fish are present, and the number of fish present in the underwater space in the echo image. The plurality of data sets for learning each include: an echo image for learning that is based on received sound waves reflected by fish when sound waves are transmitted in the underwater space where fish are present; and the number of fish present in the underwater space in the echo image. The estimator is used on an echo image generated on the (Continued)

basis of received sound waves reflected by an unknown number of fish present in the underwater space after transmitting sound waves in the underwater space, so as to calculate the number of the unknown number of fish present in the underwater space.

10 Claims, 10 Drawing Sheets

(56) References Cited

U.S. PATENT DOCUMENTS

| | | | |
|---|---|---|---|
| 2008/0031092 A1* | 2/2008 | Iida | G01S 7/523 367/87 |
| 2009/0220922 A1 | 9/2009 | Lee et al. | |
| 2019/0228218 A1* | 7/2019 | James | G06N 3/08 |
| 2019/0353765 A1 | 11/2019 | Sato et al. | |
| 2020/0090013 A1 | 3/2020 | Ikeda et al. | |
| 2022/0071180 A1* | 3/2022 | Chrobak | G06V 10/42 |

FOREIGN PATENT DOCUMENTS

| | | | | |
|---|---|---|---|---|
| IN | 201941050634 A | * | 12/2019 | ............ A16M 5/17 |
| JP | S57-062026 B2 | | 12/1982 | |
| JP | H11-296650 A | | 10/1999 | |
| JP | 2006105700 A | * | 4/2006 | ............ G01S 15/96 |
| JP | 2009-213473 A | | 9/2009 | |
| JP | 2018-044773 A | | 3/2018 | |
| JP | 2019-200175 A | | 11/2019 | |
| JP | 2020-085609 A | | 6/2020 | |
| KR | 20180057785 A | * | 5/2018 | ............ G06Q 50/26 |
| WO | WO-2014/207991 A1 | | 12/2014 | |

OTHER PUBLICATIONS

Search Report and Written Opinion in International Application No. PCT/JP2021/037884 dated Nov. 22, 2021, 6 pages.
Onitsuka Yuki, "Development of fish school behavior simulator in running water", River maintenance fund subsidy project, Graduate School of Engineering, Kyushu Institute of Technology, (Mar. 25, 2013), River maintenance fund subsidy project, Graduate School of Engineering, Kyushu Institute of Technology, URL: http://public-report.kasen.or.jp/241212010.pdf, XP055921856 [Y] 3-4 * pp. 20-23, 25-30, 37, fig. 2.2.11, non-official translation (Onitsuka, Kouki. Kasen Seibi Kikin Grant Program. Development of fish school behavior simulator in running water. Result report of Kasen Seibi Kikin grant program. The River Foundation [online].

* cited by examiner

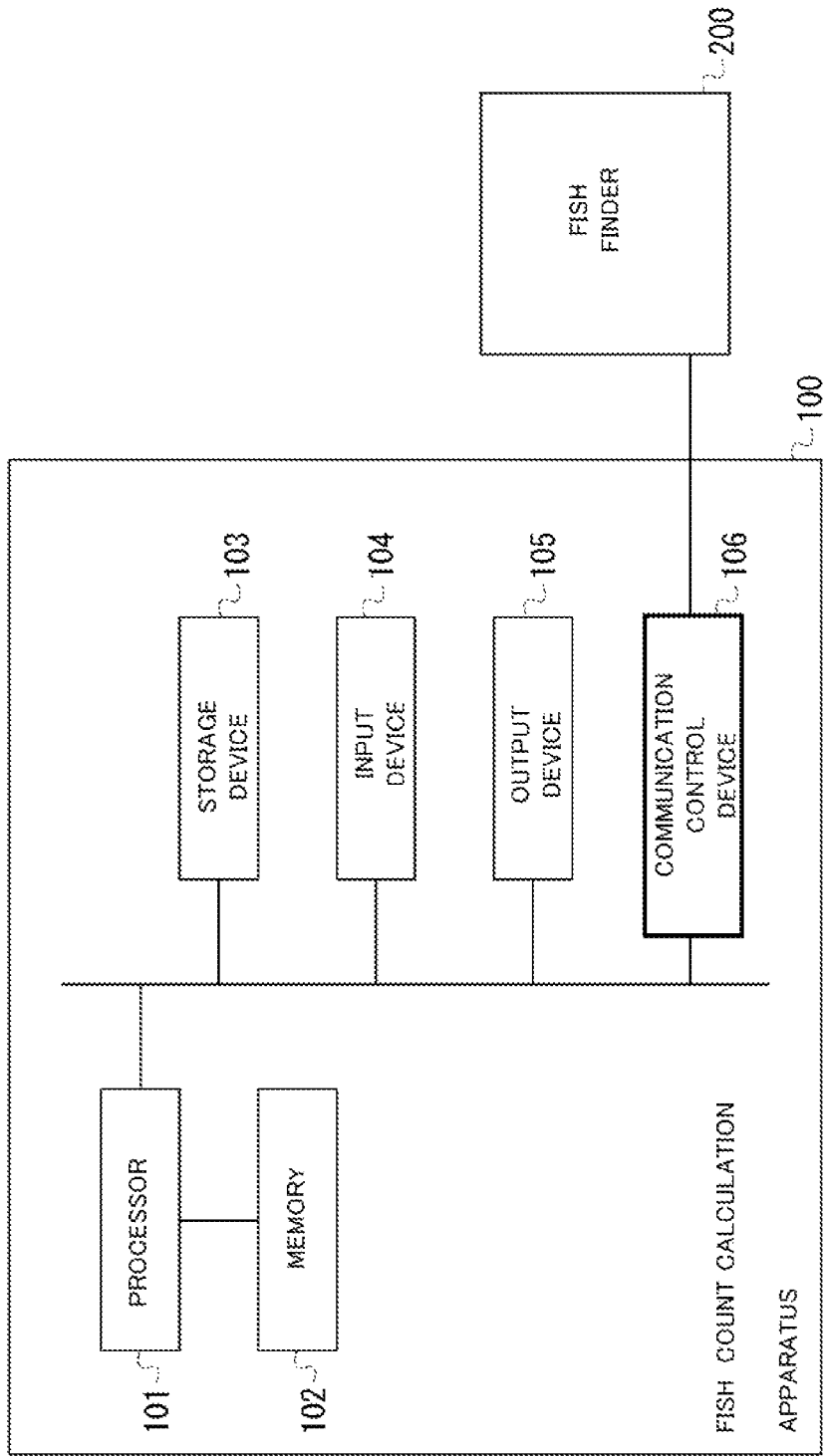
[Fig. 1]

[Fig. 2]
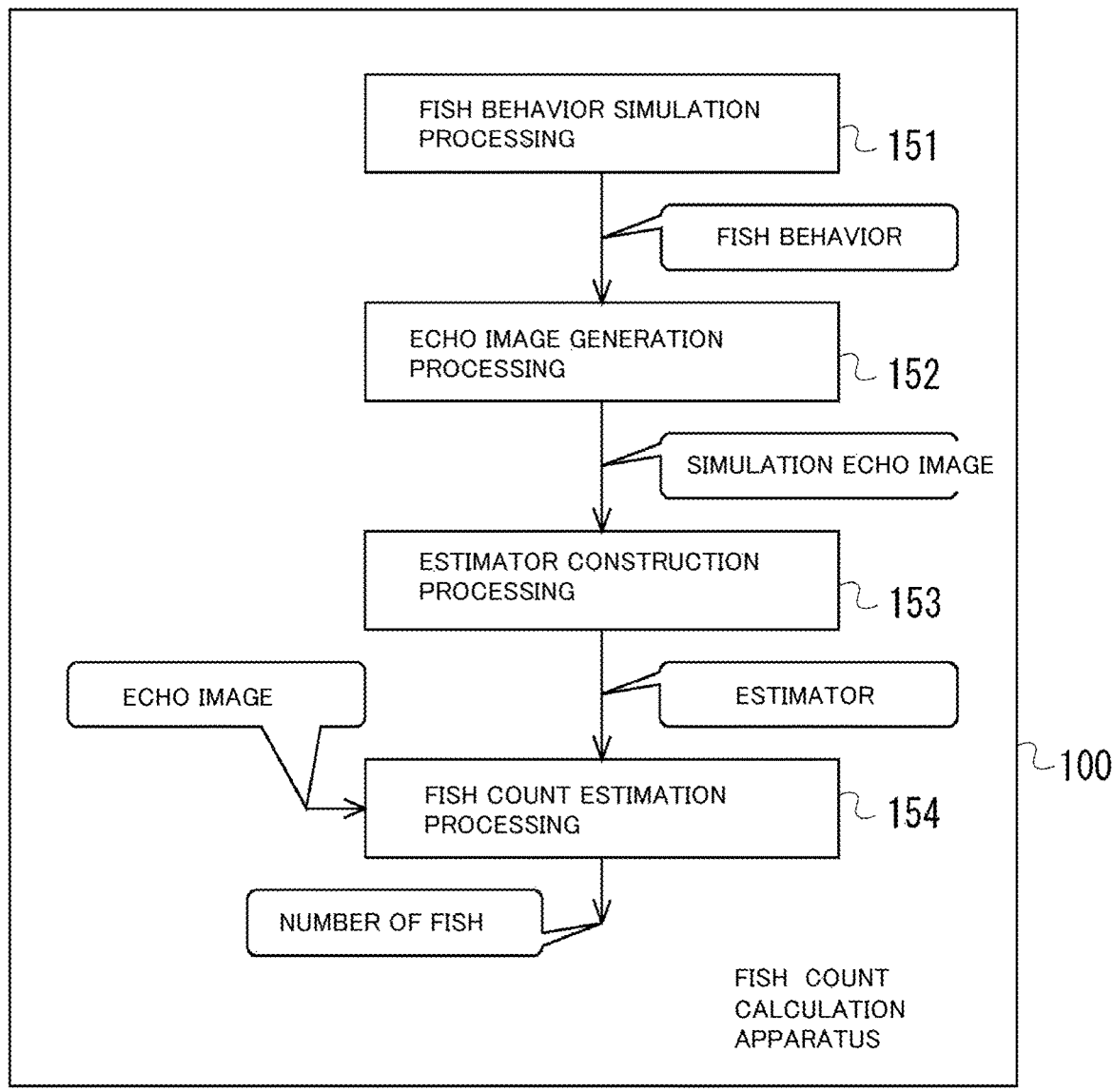

[Fig. 3]
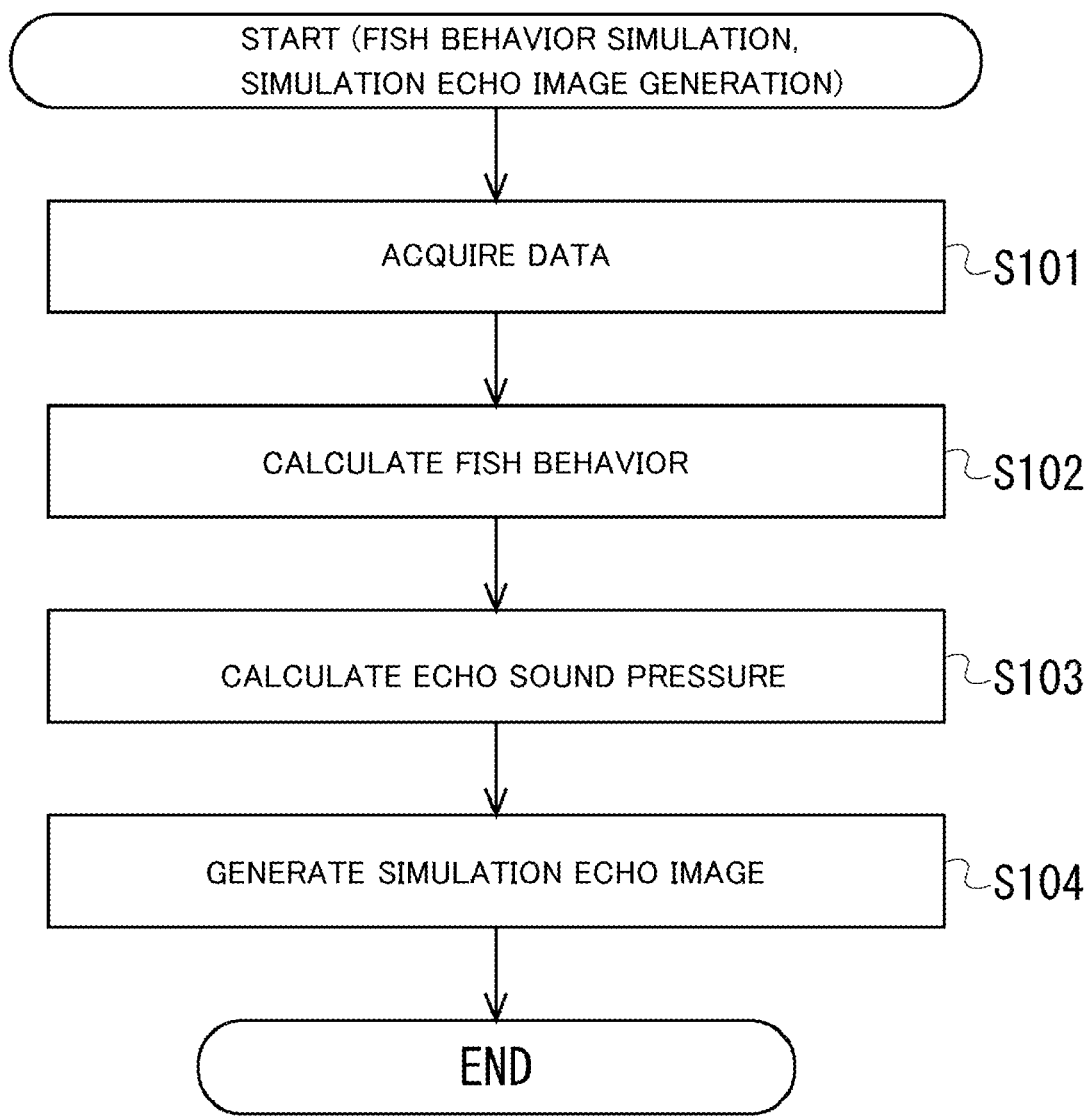

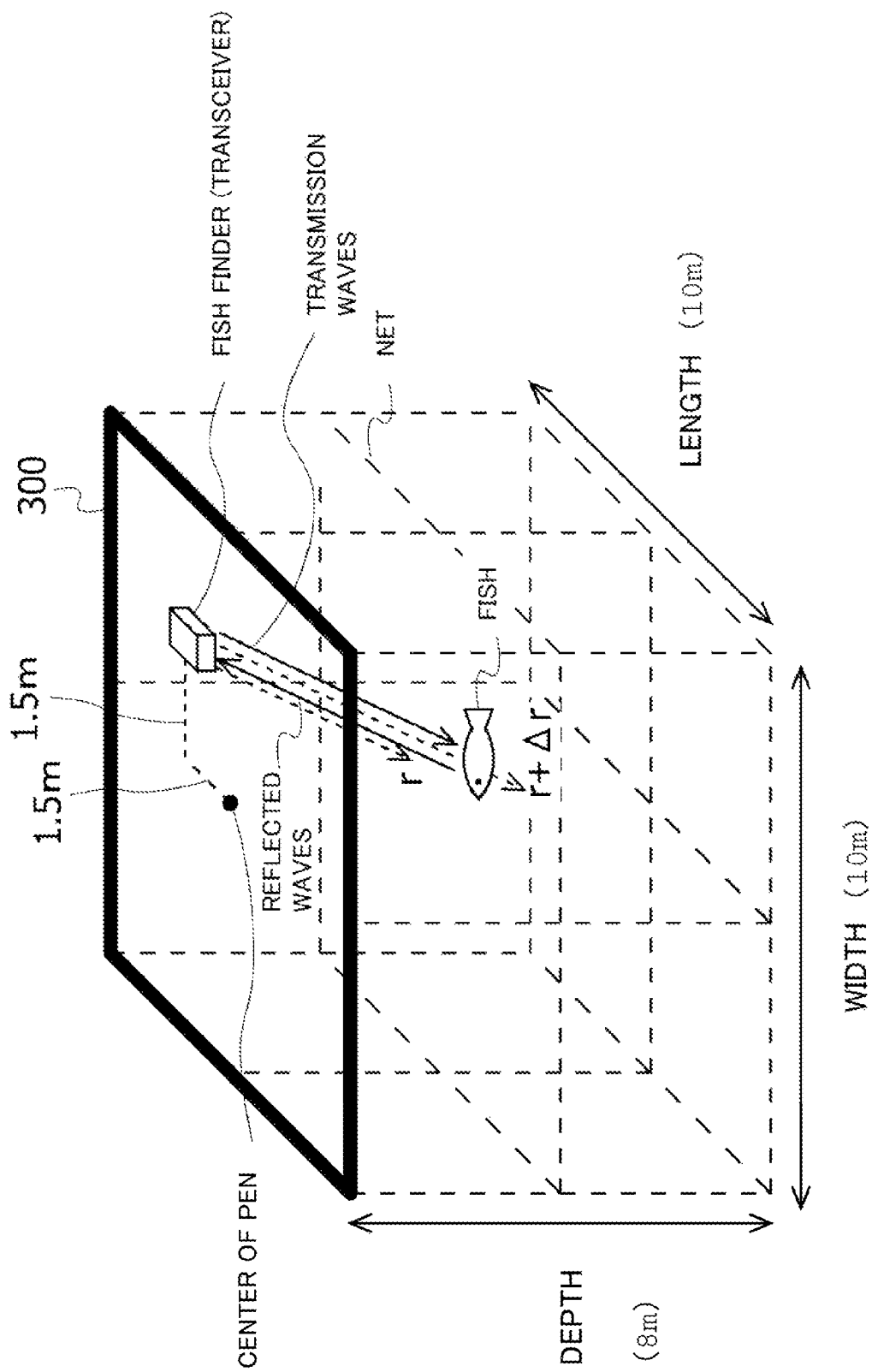
[Fig. 4]

[Fig. 5]
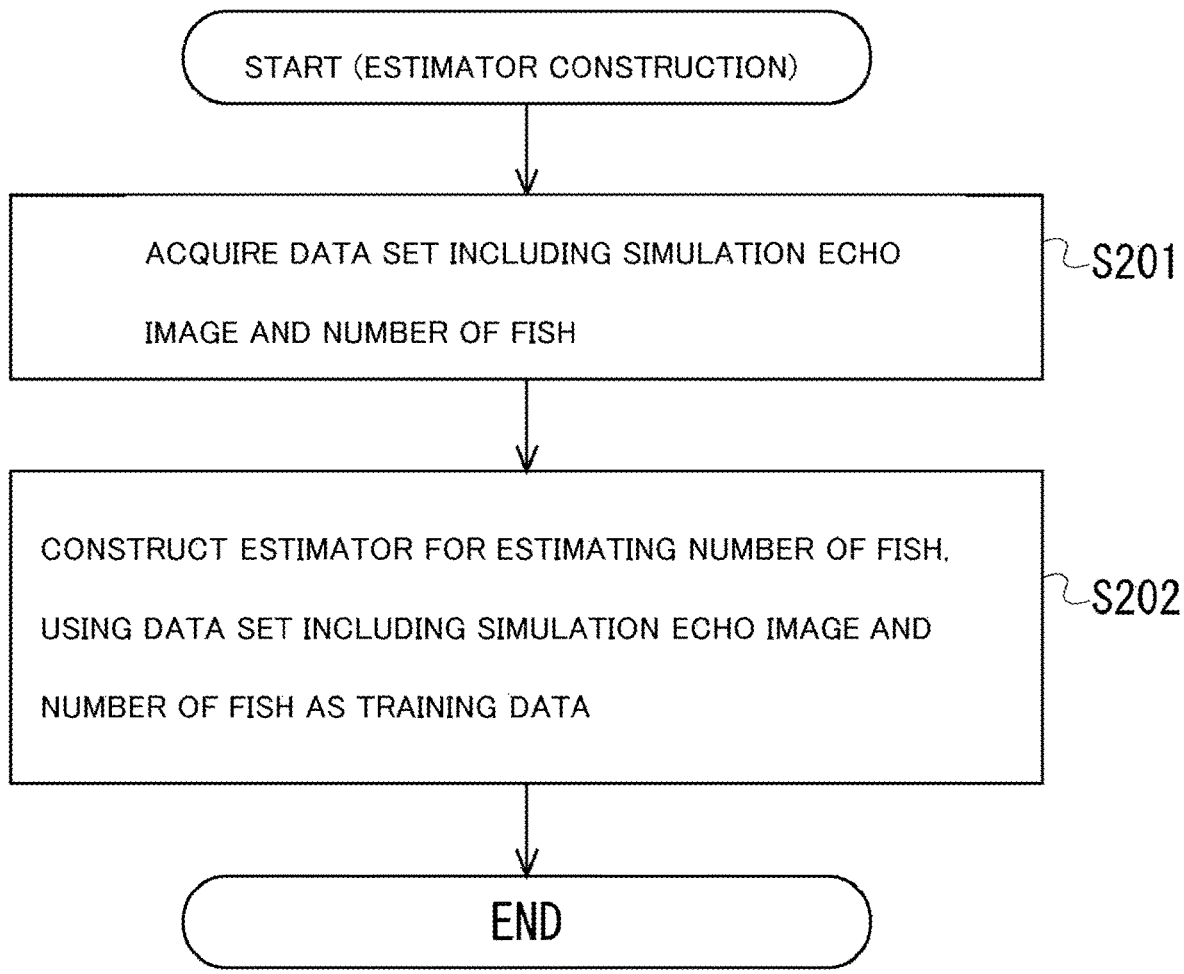

[Fig. 6]
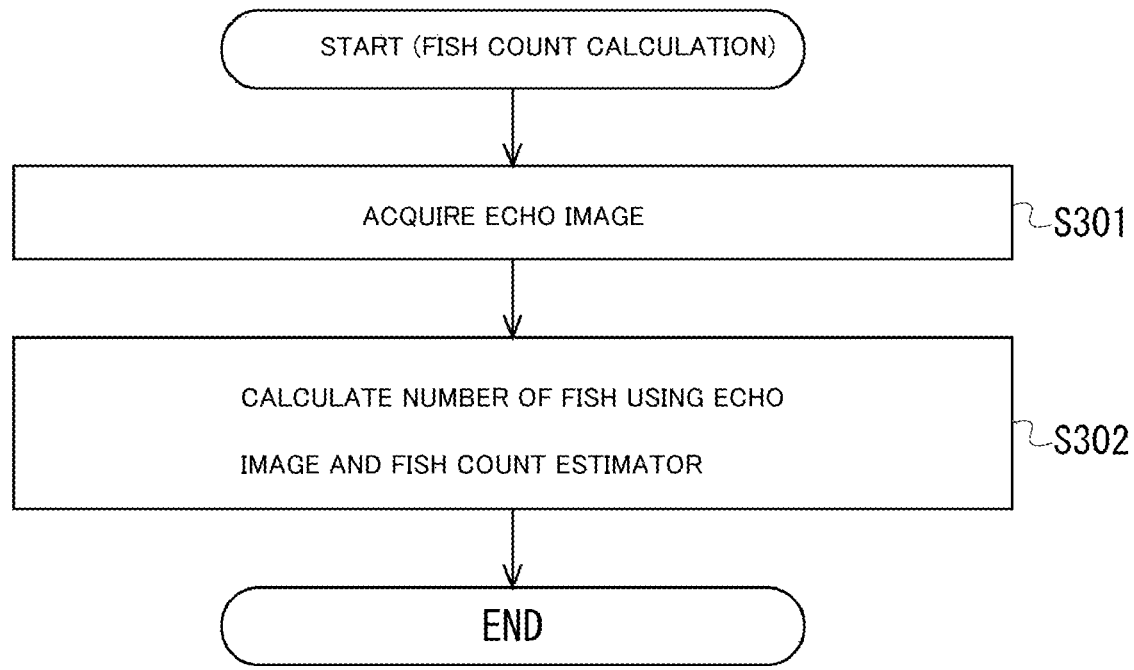

[Fig. 7]
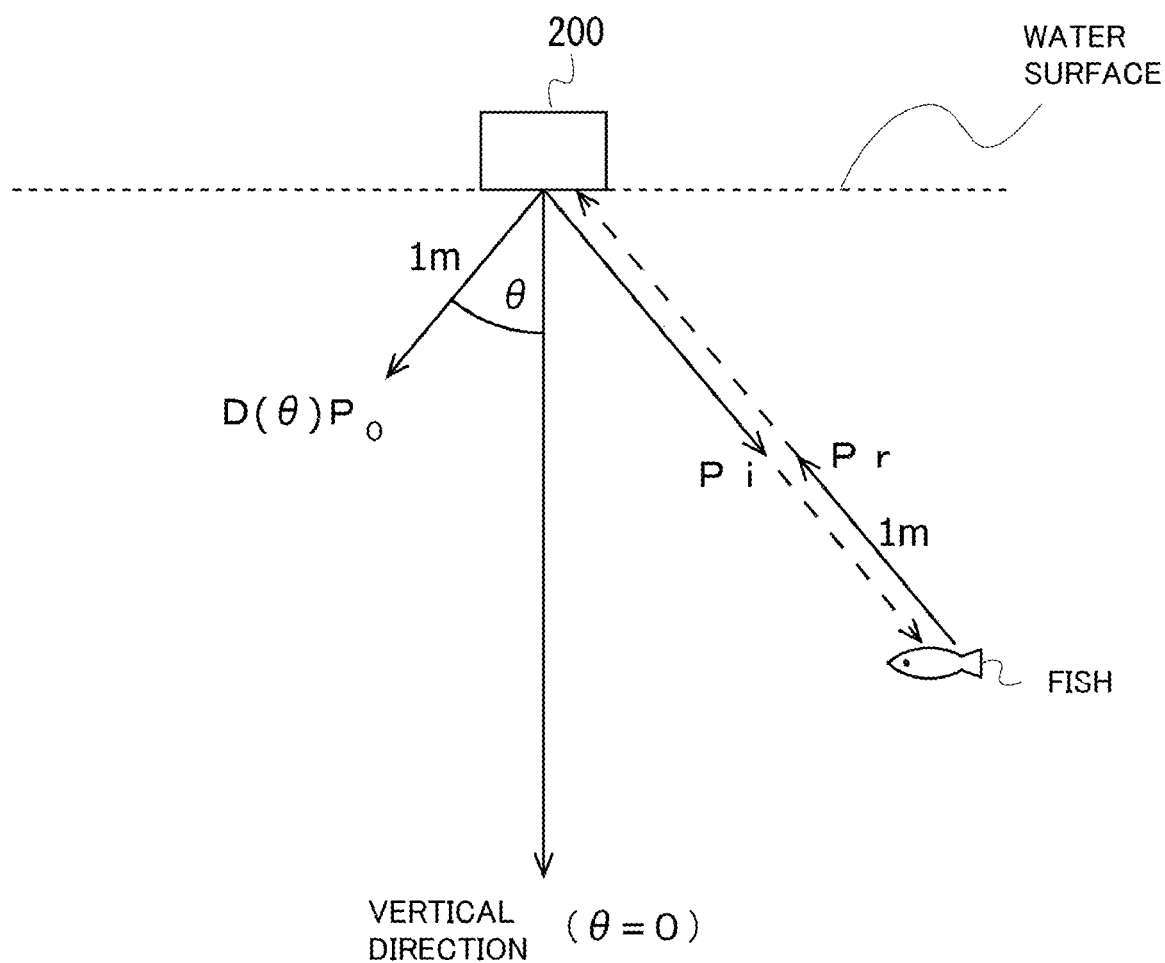

[Fig 8]
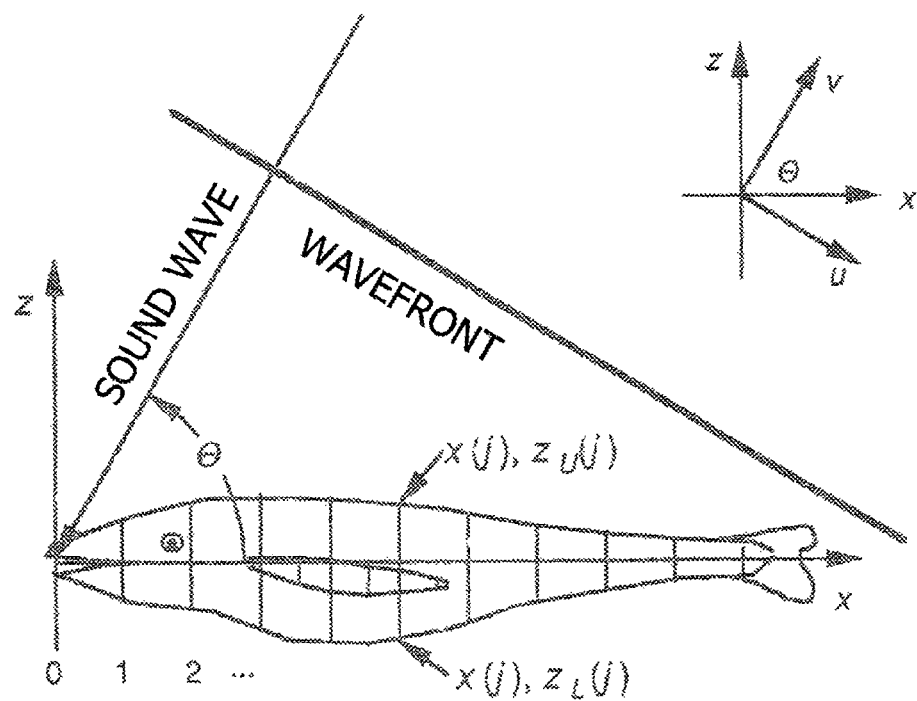
[Fig 9]
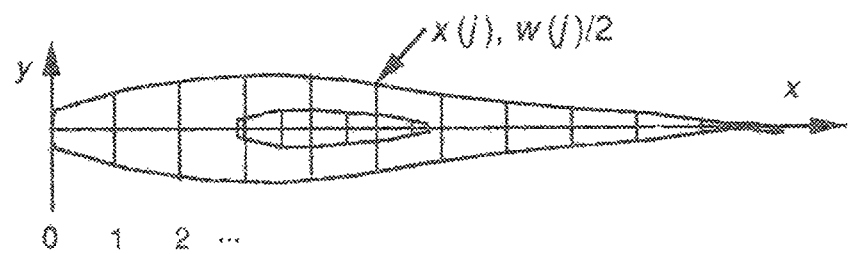

[Fig. 10]
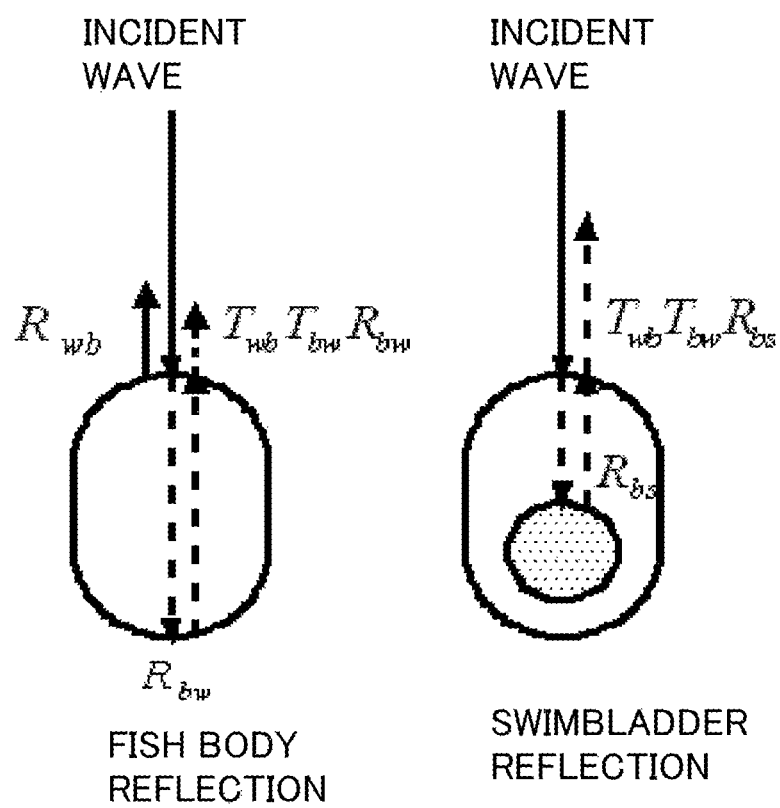

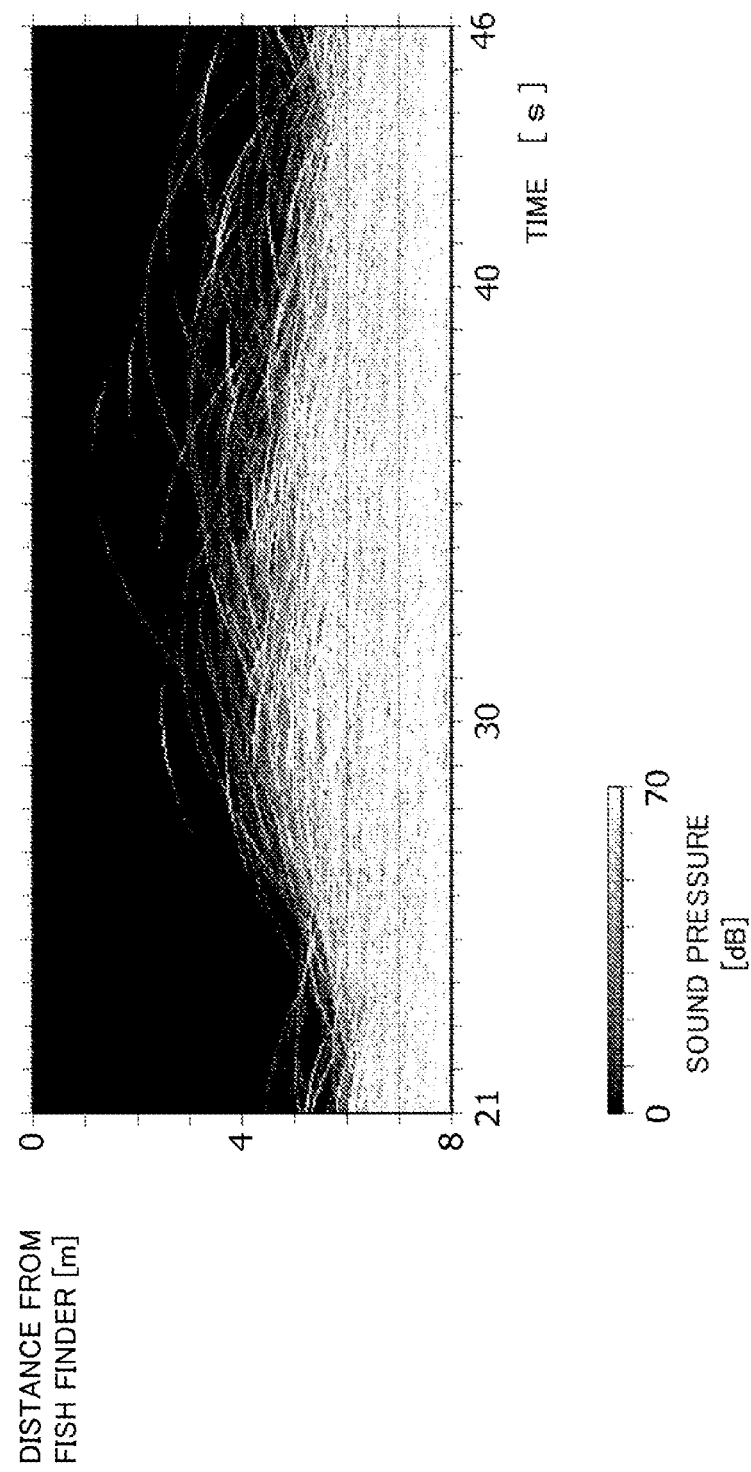
[Fig. 11]

FISH COUNT CALCULATION METHOD, FISH COUNT CALCULATION PROGRAM, AND FISH COUNT CALCULATION DEVICE

TECHNICAL FIELD

The present invention relates to a fish count calculation method, a fish count calculation program, and a fish count calculation apparatus.

BACKGROUND ART

Demand for farmed fish is increasing more and more as a result of an increase in the world population and depletion of natural marine resources due to overfishing. In addition, increasing the production of farmed fish is an important issue because the farmed fish can be expected to be supplied more stably than wild fish, which undergo natural fluctuations. In order to ensure a stable supply, it is necessary to regularly monitor aquaculture pens, keep track of the current biomass (number and sizes of fish) in the cage, and confirm whether there are any problems such as the spread of fish diseases or death.

CITATION LIST

Patent Literature

[PTL 1] Japanese Examined Patent Publication No. S57-62026
[PTL 2] Japanese Patent Application Publication No. H11-296650
[PTL 3] Japanese Patent Application Publication No. 2018-44773
[PTL 4] Japanese Patent Application Publication No. 2019-200175

SUMMARY OF INVENTION

Technical Problem

However, especially in the case of marine aquaculture, it is difficult to monitor the pen, and in many cases only a part of the pen can be observed even with use of cameras and acoustic observation devices. Conventionally, a fish finder using underwater ultrasonic waves and a fish gauge using the principle of a fish finder have been used to estimate the amount of fish and survey fish school resources. Although it is possible to determine the distribution of the school of fish, the depth of the school of fish, and the density of the school of fish with a fish finder, it has been difficult to count the number of fish.

An object of the present invention is to easily ascertain the number of fish present in an underwater space such as a pen.

Solution to Problem

The disclosed technology employs the following means to solve the above problems.

That is, a first aspect is
a fish count calculation method, comprising, by a computer:
constructing an estimator for estimating the number of fish present in an underwater space through machine learning using, as training data, a plurality of training data sets, each of which includes a training echo image based on sound waves received upon being reflected by the fish when sound waves are transmitted in the underwater space in which the fish are present, and the number of fish present in the underwater space in the echo image; and
calculating the number of an unknown number of fish present in the underwater space by using the estimator on an echo image generated based on sound waves that are transmitted in the underwater space and received upon being reflected by the unknown number of fish present in the underwater space.

Aspects of the disclosure may be realized by a program being executed by an information processing apparatus. That is, the disclosed configuration can be defined as a program for causing an information processing apparatus to execute processing executed by each unit in the above-described aspects, or a computer-readable recording medium on which the program is recorded. Also, the disclosed configuration may be defined as a method by which the information processing apparatus executes the processing executed by the above-described units. The disclosed configuration may also be defined as a system including an information processing device that performs the processing executed by the above-described units.

Advantageous Effects of Invention

According to the present invention, it is possible to easily find out the number of fish present in an underwater space such as a pen.

BRIEF DESCRIPTION OF DRAWINGS

FIG. 1 is a diagram showing an exemplary configuration of a system according to an embodiment.
FIG. 2 is a diagram showing an example of functional blocks of a fish count calculation apparatus.
FIG. 3 is a diagram showing an example of an operation flow of fish behavior simulation processing and simulation echo image generation processing performed by the fish count calculation apparatus.
FIG. 4 is a diagram showing an example of a pen used in a numerical simulation by a fish count calculation apparatus.
FIG. 5 is a diagram showing an example of an operation flow of construction of an estimator for estimating the number of fish by the fish count calculation apparatus.
FIG. 6 is a diagram showing an example of an operation flow of calculation of the number of fish by the fish count calculation apparatus.
FIG. 7 is a diagram showing an example of a fish finder and fish.
FIG. 8 is a diagram showing an example of xz coordinates and uv coordinates fixed to a fish.
FIG. 9 is a diagram showing an example of xy coordinates fixed to a fish.
FIG. 10 is a diagram showing an example of reflection and transmission of sound waves in a fish body and an example of reflection and transmission in a swimbladder.
FIG. 11 is a diagram showing an example of a generated simulation echo image.

DESCRIPTION OF EMBODIMENTS

Embodiment

A fish count calculation method according to an embodiment includes: constructing, by a computer, an estimator for estimating the number of fish present in an underwater space through machine learning using, as training data, a plurality of training data sets, each of which includes a training echo image based on sound waves received upon being reflected by the fish when the sound waves are transmitted in the underwater space in which the fish are present, and the number of fish present in the underwater space in the training echo image; and calculating, by a computer, the number of an unknown number of fish present in the underwater space by using the estimator on an echo image generated based on sound waves that are transmitted in the underwater space and received upon being reflected by the unknown number of fish present in the underwater space.

Here, the underwater space includes, for example, a space below the surface of a body of water such as a river, lake, pond, or sea, or a space inside a pen or the like obtained by partitioning the water using a net, the bottom of the body of water, or the like. Water includes fresh water, brackish water, and sea water in which the fish to be counted can live. Underwater spaces include not only those that use the natural environment, but also spaces inside structures that artificially store water, such as pools and water tanks. A plurality of fish to be counted are present in the underwater space. The fish may be freshwater fish or saltwater fish, and the types of fish are, for example, fish subjected to aquaculture (Japanese amberjack, yellowtail, red sea bream, greater amberjack, Japanese horse mackerel, chub mackerel, Japanese pufferfish, flounder, salmon, trout, etc.), but there is no limitation to these. Objects to be counted may include not only fish but also aquatic organisms (fish and shellfish) such as shrimp.

In a pen obtained by setting up a net in water, the boundary between the inside and the outside is partitioned by the net, the surface of the water, the bottom of the body of water, and the like, and thus fish cannot come and go between the inside and the outside of the pen. Various shapes such as a cuboid, a cube, and a cylinder can be adopted as the shape of the underwater space. As an example, it is conceivable to define an underwater space with a cuboid having a length, a width, and a height. In this case, the underwater space is a cuboid-shaped space having a horizontal length X, a vertical length Y, and a depth Z. Here, the horizontal direction, the vertical direction, and the depth direction may be orthogonal to each other. The water surface may also be defined as the upper surface of the underwater space. However, the above is an example, and the three-dimensional shape of the underwater space is not limited to a cuboid.

An echo image is an image generated by a fish finder or the like based on the sound pressures of sound waves received as reflected waves resulting from a sound wave transmitted from a water surface of the underwater space being reflected by a fish or the like.

According to the fish count calculation method, it is possible to construct an estimator that estimates the number of fish present in an underwater space using a training data set including a training echo image and the number of fish as training data. In addition, according to the fish count calculation method, the number of fish present in an underwater space can be calculated based on the constructed estimator and the echo image obtained by the fish finder installed in the underwater space such as a pen. According to the fish count calculation method, by constructing an estimator using a larger amount of training data, the number of fish or the like present in the underwater space can be calculated more accurately.

The configuration of the embodiment will be further described below with reference to the drawings. The configuration of the embodiment is an example. The configuration of the invention is not limited to the specific configuration of the embodiment. In carrying out the invention, a specific configuration can be appropriately adopted according to the embodiment.

Configuration Example

FIG. 1 is a diagram showing an exemplary configuration of a system according to this embodiment. The system of this embodiment includes a fish count calculation apparatus 100 and a fish finder 200. The fish count calculation apparatus 100 is communicably connected to the fish finder 200 directly or via a network such as the Internet, or the like.

The fish count calculation apparatus 100 transmits sound waves within a predetermined range (an underwater space such as a pen) where a plurality of fish exist, and acquires an echo image based on the sound waves received upon being reflected by the plurality of fish. Sound waves include ultrasonic waves. Also, the fish count calculation apparatus 100 constructs an estimator that estimates the number of fish based on the echo image through machine learning using, as training data, a set of an echo image and the number of fish present within the predetermined range. Furthermore, the fish count calculation apparatus 100 uses the constructed estimator to calculate the number of fish present in an actual pen or the like based on an echo image obtained from a fish finder or the like installed near the pen or the like. Also, the fish count calculation apparatus 100 simulates the behavior of fish present within a predetermined range and echo images obtained from a fish finder or the like, and generates training echo images for machine learning.

The fish count calculation apparatus 100 can be realized using a dedicated or general-purpose computer (information processing device) such as a work station (WS), a PC (Personal Computer), a smartphone, a tablet terminal, or an electronic device equipped with a computer. The fish count calculation apparatus 100 can be realized using a computer (server device) that provides a service through a network. The fish count calculation apparatus 100 can be realized by a calculation apparatus that executes parallel processing by an MPI (Message Passing Interface) in which CPUs or GPUs are paralleled on a large scale.

The fish finder 200 transmits sound waves underwater and receives reflected waves reflected by objects such as fish in the water. Also, the fish finder 200 generates an echo image based on the sound pressures (echo sound pressures) of the sound waves received as reflected waves. The echo image is an image in which the sound pressures (echo sound pressures) of sound waves received by the fish finder are represented by the shade of color, the horizontal axis representing the time when the sound waves were transmitted, and the vertical axis representing the distance from the fish finder. The fish finder 200 is installed at the water surface (sea surface) of an underwater space such as a pen.

The fish count calculation apparatus 100 has a processor 101, a memory 102, a storage device 103, an input device 104, an output device 105, and a communication control device 106. These are connected to each other by a bus. The memory 102 and the storage device 103 are non-transitory computer-readable recording media. The hardware configuration of the fish count calculation apparatus 100 is not limited to the example shown in FIG. 1, and constituent elements may be omitted, replaced, or added as appropriate.

The fish count calculation apparatus 100 can realize a function matching a predetermined purpose due to the processor 101 loading a program stored in a recording medium into the work region of the memory 102 and executing the program, and the constituent elements and the like being controlled through the execution of the program.

The processor 101 is, for example, a CPU (Central Processing Unit) or the like. The processor 101 executes fish behavior simulation processing 151, echo image generation processing 152, estimator construction processing 153, and fish count estimation processing 154 by loading and executing programs stored in the memory 102. The processor 101 also acquires data and the like to be used in each processing from the storage device 103 and other devices such as the fish finder 200 via the communication control device 106.

The memory 102 is constituted by, for example, a RAM (Random Access Memory), or a RAM and a ROM (Read Only Memory). The memory 102 is also called a main memory.

The storage device 103 is, for example, an EPROM (Erasable Programmable ROM), a hard disk drive (HDD, Hard Disk Drive), or the like. The storage device 103 can also include a removable medium, that is, a portable recording medium. A removable medium is, for example, a USB (Universal Serial Bus) memory, or a disc recording medium such as a CD (Compact Disc) or a DVD (Digital Versatile Disc). The storage device 103 is also called a secondary storage device.

The storage device 103 stores various programs, various types of data, and various tables to be used by the fish count calculation apparatus 100 in a recording medium in a readable and writable manner. The storage device 103 stores an operating system (OS), various application programs, various tables, and the like. Information stored in the storage device 103 may also be stored in the memory 102. The information stored in the memory 102 may also be stored in the storage device 103.

Programs for executing fish behavior simulation processing, echo image generation processing, estimator construction processing, fish count estimation processing, and the like are installed in the storage device 103. Also, the storage device 103 stores various types of data and the like related to the fish, the pen, and the like used in the numerical simulation, such as echo images obtained by the fish finder, and calculation results calculated in each processing.

An operating system is software that performs mediation between software and hardware, management of memory space, file management, management of processes and tasks, and the like. The operating system includes a communication interface. A communication interface is a program for exchanging data with other external devices connected via the communication control device 106. The external device and the like include, for example, another information processing device, an external storage device, and the like.

The input device 104 includes a keyboard, a pointing device, a wireless remote controller, a touch panel, or the like. Also, the input device 104 can include a video or image input device such as a camera, or an audio input device such as a microphone.

The output device 105 includes a display device such as an LCD (Liquid Crystal Display), an EL (Electroluminescence) panel, a CRT (Cathode Ray Tube) display, or a PDP (Plasma Display Panel), and an output device such as a printer. The output device 105 may also include an audio output device such as a speaker.

The communication control device 106 connects to other devices and controls communication between the fish count calculation apparatus 100 and other devices. The communication control device 106 is, for example, a LAN (Local Area Network) interface board, a wireless communication circuit for wireless communication, or a communication circuit for wired communication. The LAN interface board and wireless communication circuit are connected to a network such as the Internet.

The steps of writing the program include not only processing that is performed chronologically in the described order, but also processing that is not necessarily performed chronologically, but is performed in parallel or individually. Some of the steps of writing the program may be omitted.

In this embodiment, a series of processing executed by the processor 101 can be executed by hardware or by software. A constituent element of hardware is a hardware circuit, and examples thereof include an FPGA (Field Programmable Gate Array), an application-specific integrated circuit (ASIC), a gate array, a combination of logic gates, and an analog circuit.

FIG. 2 is a diagram showing an example of functional blocks of the fish count calculation apparatus 100. The processor 101 of the fish count calculation apparatus 100 executes a program stored in memory 102 to execute the fish behavior simulation processing 151, the echo image generation processing 152, the estimator construction processing 153, and the fish count estimation processing 154. The processor 101 also acquires data and the like to be used in each processing from the storage device 103 and other devices such as the fish finder 200 via the communication control device 106.

The fish behavior simulation processing 151 is processing for performing a numerical simulation for calculating the position (fish behavior) of each fish present in an underwater space such as a pen based on an equation representing the behavior of fish (fish motion equation), the size of the pen, and the like. Also, in the fish behavior simulation processing 151, a numerical simulation for calculating the position of the fish is used to calculate change in the position of each fish over time.

The echo image generation processing 152 is processing for generating a simulated echo image (simulation echo image) based on the echo sound pressure of the sound waves reflected from the fish present in a predetermined range when sound waves are transmitted from the fish finder on the sea surface toward the predetermined range. In the echo image generation processing 152, sound waves reflected by each fish are calculated based on the position of each fish (fish behavior) calculated through the fish behavior simulation processing 151. Also, in the echo image generation processing 152, the echo sound pressure is calculated for each distance from the fish finder by adding up the sound waves reflected by each fish. In the echo image generation processing 152, a simulation echo image is generated based on the echo sound pressure calculated for each distance. In the echo image generation processing 152, various simulation echo images are generated by changing the number of fish, the sizes of the fish, and the like.

The estimator construction processing 153 is processing for constructing an estimator that estimates the number of fish (and the sizes of the fish) based on an echo image, using, as training data, a data set (a training data set) including data of the simulation echo image (training echo image) generated in the echo image generation processing 152 and data on the number of fish (and the sizes of the fish) used when generating the simulation echo image.

The fish count estimation processing 154 is processing for calculating, based on an echo image generated by an actual fish finder, the number of fish (and the sizes of the fish) for the echo image, by using the estimator constructed in the estimator construction processing 153.

Operation Example

<Fish Behavior Simulation Processing, Simulation Echo Image Generation Processing>

FIG. 3 is a diagram showing an example of an operation flow of fish behavior simulation processing and simulation echo image generation processing executed by the processor 101 of the computer operating as the fish count calculation apparatus 100. The fish count calculation apparatus 100 performs numerical simulation (numerical calculation) of fish behavior (change in position over time) assuming that fish are present in a predetermined underwater range (an underwater space such as a pen). Furthermore, based on the position of each fish, the fish count calculation apparatus 100 calculates the sound pressures (echo sound pressures) of sound waves that are transmitted from the fish finder into the pen, reflected by the fish, and received by the fish finder. The fish count calculation apparatus 100 adds up the echo sound pressures for each distance from the fish finder to the fish to calculate the echo sound pressure for each distance. Also, the fish count calculation apparatus 100 calculates the echo sound pressure for each distance at different times. The fish count calculation apparatus 100 generates a simulation echo image based on the calculated echo sound pressures. Furthermore, the fish count calculation apparatus 100 changes the number of fish and the sizes of the fish present in the predetermined range, performs numerical simulation of fish behavior, and generates simulation echo images with different numbers and sizes of fish. A simulation echo image is an image showing the distribution of fish in a predetermined range.

Here, with reference to FIG. 4, an example of a pen used in numerical simulation by the fish count calculator is shown. A pen 300 to be used in the numerical simulation is installed at the surface of the ocean or the like. The pen 300 has vertical and horizontal directions on the sea surface, and a net or the like is installed at the boundary between the inside and the outside of the pen to prevent fish from coming and going between the inside and the outside of the pen 300. Here, the pen 300 is, for example, a cuboid with a width of 10 m, a length of 10 m, and a depth of 8 m. The top of the pen 300 is above the sea surface (water surface). The shape of the pen 300 is not limited to a cuboid, and may be cylindrical or the like. It is also assumed that a fish finder that transmits and receives sound waves underwater is installed at a predetermined position at the sea surface within the pen 300. The fish finder is installed, for example, at a distance of 1.5 m horizontally and 1.5 m vertically from the center of the pen. The fish finder may be installed in the center of the sea surface within the pen. A plurality of fish are present inside the pen 300. The fish shown in FIG. 4 is at a position (in the water) at a distance of at least r and less than r+$\Delta$r from the fish finder. The fish count calculation apparatus 100 numerically simulates the behavior of each fish in the pen 300 in the fish behavior simulation processing. The fish count calculation apparatus 100 also calculates the sound pressures (echo sound pressures) of the reflected waves obtained by sound waves (transmission waves) transmitted from the fish finder being reflected by the fish inside the pen 300. It is assumed that the pen 300 and the like used in the numerical simulation are the same as the pen and the like for which the number of fish is to be calculated by the fish count calculation apparatus 100.

In step S101, the processor 101 of the fish count calculation apparatus 100 acquires data to be used in the numerical simulation. The processor 101 acquires data stored in the storage device 103, such as the size of the predetermined range to be calculated (pen), the number of fish, the size of each fish, the initial position of each fish, the fish behavior equation, and various parameters. The processor 101 may also acquire these pieces of data from other devices via the communication control device 106, a network, or the like.

In step S102, the processor 101 numerically simulates fish behavior (change in position over time) based on the data acquired in step S101. The processor 101 calculates the behavior of each fish that is assumed to be present in the pen to be numerically simulated, using an equation representing the behavior of the fish. The processor 101 stores the calculated behavior of each fish (change in position of each fish over time) in the storage unit 107. The behavior of the fish is represented, for example, as the position of the fish at each time for each fish. Calculation of the behavior of the fish (fish behavior simulation processing) will be described in detail later.

In step S103, the processor 101 calculates the echo sound pressure based on the position of each fish calculated in step S102. The processor 101 assumes a fish finder installed at the sea surface in the pen. Based on the position of each fish calculated in step S102, the processor 101 calculates the sound pressure of the sound waves transmitted from the fish finder, reflected by each fish, and received by the fish finder. Furthermore, the processor 101 aggregates the sound pressures of the sound waves from each fish and calculates the sound pressure (echo sound pressure) for each distance from the fish finder. Furthermore, with the processor 101, the distance from the fish finder depends on the time between transmitting and receiving the sound waves.

In step S104, the processor 101 generates a simulation echo image based on the echo sound pressure for each distance from the fish finder calculated in step S103. The simulation echo image is an image simulating an echo image generated by the fish finder. Also, the processor 101 calculates the sound pressure for each distance from the fish finder based on the position of the fish at different times by changing the time. The processor 101 generates a simulation echo image based on the sound pressure for each time and each distance. The processor 101 stores the generated simulation echo image in the storage unit 107 together with data on the number of fish and the sizes of the fish used when generating the simulation echo image.

Details of the calculation of the echo sound pressure in step S103 and the generation of the simulation echo image (simulation echo image processing) in step S104 will be described later.

In addition, the fish count calculation apparatus 100 changes the number of fish, the size of the fish (distribution of fish sizes), and the like in various ways, and generates simulation echo images for various cases. The sizes of the fish are classified into a plurality of types, and the number of fish in each class can be obtained (for example, X fish are less than A, Y fish are at least A and less than B, and Z fish are B or more). The size of the fish is, for example, the length of the fish, the thickness of the fish, or the weight of the fish. The size of the fish is an example of the shape of the fish. In this manner, the estimator learns to be able to estimate the number of fish present in the underwater space for each class.

Here, one type of fish is assumed, but the fish count calculation apparatus 100 may also define the fish motion equation according to characteristics of each of a plurality of types of fish, and may simulate the behavior of the fish, generate a simulation echo image, and the like for a plurality of types of fish. In addition to fish, other aquatic organisms such as crustaceans such as shrimp and crabs, and mollusks such as squid and octopus may have a motion equation defined therefor according to the characteristics of each organism, and the behavior of each organism may be simulated, and a simulation echo image may be generated, and the like.

<Construction of Estimator>

FIG. 5 is a diagram showing an example of an operation flow for constructing an estimator for estimating the number of fish using the fish count calculation apparatus. The fish count calculation apparatus 100 constructs an estimator that uses a deep learning model for machine learning to estimate the number of fish based on an echo image, using, as training data, a training data set including a simulation echo image generated based on a numerical simulation and the number of fish. Here, the number of fish and the sizes of the fish (distribution of fish sizes) may be used instead of the number of fish.

In step S201, the processor 101 of the fish count calculation apparatus 100 acquires, from the storage device 103, the simulation echo image obtained through the operation flow of FIG. 3 and the number of fish associated with the simulation echo image.

In step S202, the processor 101 uses a deep learning model for machine learning to construct an estimator that estimates the number of fish based on the simulation echo image (echo image) using, as training data, a training data set including the simulation echo image and the number of fish obtained in step S201. Any model may be used as the deep learning model used here. The processor 101 stores the constructed estimator for estimating the number of fish in the storage device 103. For construction of the estimator, deep learning using neural networks, multiple regression analysis, a technique using a learning space such as Look Up Table, or the like can be used. Methods other than machine learning may also be used when constructing the estimator. By using simulation echo images as training data, a larger amount of training data can be prepared compared to using actual echo images. By using a large amount of training data, an estimator with higher performance can be constructed. The simulation echo images and echo images used here are examples of training echo images.

Here, the fish count calculation apparatus 100 uses the simulation echo image generated through the numerical simulation to construct the estimator, but an echo image generated by the fish finder 200 installed at the water surface of an actual pen may be used instead of or in addition to the simulation echo image. At this time, it is assumed that the number of fish in the pen and the sizes of the fish are already known. A more realistic estimator can be constructed by using actual echo images.

<Calculation of Number of Fish>

FIG. 6 is a diagram showing an example of an operation flow for calculating the number of fish by the fish count calculation apparatus. The fish count calculation apparatus 100 acquires an actual echo image generated by the fish finder 200 installed in the pen as shown in FIG. 4, and calculates the number of fish using the constructed estimator. The size of the pen, the installation position of the fish finder, the type of fish, and the like used in the numerical simulation when constructing the estimator are the same as the actual size of the pen for which the number of fish is to be calculated, the size of the fish finder, the type of fish, and the like. Here, in the operation flow of FIGS. 3 and 5, if the number of fish and the size of the fish (distribution of fish sizes) are used instead of the number of fish, the number of fish and the size of the fish (distribution of fish sizes) are used instead of the number of fish in the operation flow of FIG. 6 as well.

In step S301, the processor 101 of the fish count calculation apparatus 100 acquires, via the communication control device 106, an echo image generated by the fish finder 200 installed in the pen. The processor 101 stores the acquired echo image in the storage device 103. The echo image generated by the fish finder 200 may also be stored in the storage device 103 in advance.

In step S302, the processor 101 uses the estimator for estimating the number of fish, which was constructed in the operation flow of FIG. 5, to calculate the number of fish included in the pen in which the fish finder 200 that generated the echo image is installed, based on the echo image acquired in step S301. The processor 101 stores the estimated number of fish in the storage device 103 in association with the echo image. Thus, the fish count calculation apparatus 100 can calculate the number of fish present in the pen where the fish finder 200 is installed, according to the echo image generated by the fish finder 200.

(Fish Behavior Simulation Processing)

Here, the fish behavior simulation processing in step S102 of FIG. 3 will be described in detail. In the fish behavior simulation processing, the behavior (change in position over time) of the fish present in an underwater space (pen) is numerically simulated. Here, it is assumed that a plurality of fish are present in an underwater space such as a pen installed in the ocean or the like. It is assumed that a net or the like is installed on the boundary between the inside and the outside of the pen so that fish cannot come and go between the inside and the outside of the pen. Here, as shown in FIG. 4, the size of the pen is 10 m wide, 10 m long, and 8 m deep. Here, the horizontal direction is the x direction, the vertical direction is the y direction, and the depth direction (the direction from the sea floor to the sea surface) is the z direction. The x-, y-, and z-directions are orthogonal to each other. The fish, for example, form a school and travel around the inside of the pen in the shape of a truncated cone whose radius increases toward the bottom.

Here, each fish is regarded as a self-oscillating particle, and the motion of the fish is described as follows using a second-order differential equation (fish motion equation).

$$\frac{dx}{dt} = v$$
$$\frac{dv}{dt} = F + \eta$$
[Math. 1]

Here, x is the fish position vector (x, y, z), v is a fish velocity vector (vx, vy, vz), F is a force vector sum, and η is noise. The force vector F includes an attractive force, an alignment force, a repulsive force, a propulsive force, water resistance, light repulsion, pressure from walls (boundaries), and the like. Each fish also has a field of view and a maximum angle by which direction change is possible in 1 second.

<Attractive Force, Repulsive Force>

Fish in a school try to get close to each other. The attractive force is obtained by expressing this as a force acting between two individuals (two fish). The attractive force $F_{ij,attract}$ that the i-th fish receives from the j-th fish is inversely proportional to the distance $r_{ij}$ between the two individuals. The attractive force $F_{ij,attract}$ is expressed as follows.

$$F_{ij,attract} = c_1 \frac{x_j - x_i}{r_{ij}^{c_2}} \quad [\text{Math. 2}]$$

Here, $x_i$ is the position vector of the i-th fish, and $c_1$ and $c_2$ are constants.

If the perceptual area of the i-th fish is denoted as $S_{i,a}$, the average of the $F_{ij,attract}$ received from all the fish in that area is the attractive force $F_{i,attract}$ received by the i-th fish. The attractive force $F_{i,attract}$ is expressed as follows.

$$F_{i,attract} = \frac{1}{N_{i,a}} \sum_{j \in S_{i,a}} F_{ij,attract} \quad [\text{Math. 3}]$$

Here, $N_{i,a}$ is the number of fish in the perceptual area of the i-th fish. $S_{i,a}$ is a sphere of radius Ra.

Fish also try to avoid collisions with each other. The repulsive force is obtained by expressing this as a force acting between two individuals. The repulsive force $F_{ij,repulsive}$ that the i-th fish receives from the j-th fish is expressed as follows.

$$F_{ij,repulsive} = -c_3 \frac{x_j - x_i}{r_{ij}^{c_4}} \quad [\text{Math. 4}]$$

Here, $c_3$ and $c_4$ are constants.

Similarly to the attractive force, the average of the $F_{ij,repulsive}$ received from the $N_{i,r}$ fish included in the perceptual area $S_{i,r}$ represented by a sphere of radius Rr is the repulsive force $F_{i,repulsive}$ received by the i-th fish. The repulsive force $F_{i,repulsive}$ is expressed as follows.

$$F_{i,repulsive} = \frac{1}{N_{i,r}} \sum_{j \in S_{i,r}} F_{ij,repulsive} \quad [\text{Math. 5}]$$

<Alignment Force>

Fish in a school try to reduce energy consumption by riding the currents of water created by surrounding fish, or go to a location with a common purpose such as food. At this time, the fish tries to match its speed with other fish around it. The alignment force is obtained by expressing this as a force acting between two individuals. In general, an expression that actually recognizes the speed of the surrounding fish is used as the formula for the alignment force. The alignment force $F_{ij,orientation}$ that the i-th fish receives from the j-th fish can be expressed as follows using the constant J.

$$F_{ij,orientation} = J(v_j - v_i) \quad [\text{Math. 6}]$$

If the perceptual area of the i-th fish is denoted as $S_{i,o}$, the alignment force $F_{i,orientation}$ received by the i-th fish is expressed as follows.

$$F_{i,orientation} = \frac{1}{N_{i,o}} \sum_{j \in S_{i,o}} F_{ij,orientation} \quad [\text{Math. 7}]$$

Here, $N_{i,o}$ is the number of fish within the perceptual area defined by the sphere of radius Ro.

When $<v>_i$ is the local average velocity for the fish in the perceptual area, the alignment force $F_{i,orientation}$ is expressed as follows.

$$\frac{1}{N_{i,o}} \sum_{j \in S_{i,o}} F_{ij,orientation} = J(<v>_i - v_i) \quad [\text{Math. 8}]$$

The constant J is, for example, 0.95.

In this manner, the alignment force is often determined by matching the speed of the surrounding fish, but fish sense the flow speed in the surrounding area in lateral lines. In view of this, the average speed $<v>_i$ may be given by the current speed in the pen by matching the speed to the flow speed at that spot rather than the swimming speed of other fish in the perceptual area. The flow speed in the pen can be estimated from a flow meter installed at a corner of the pen. However, it is difficult to measure the flow speed at all locations in a pen densely populated with fish. Here, for example, the flow speed distribution is given as in the following Case 01 to Case 03. The flow speed given here is a value close to the measurement result of the flow meter. However, since it is known from observation that there are no fish near the center of the pen, the flow speed is not given in a range of 1 m from the center of the pen.

(Case 01) A uniform flow speed of 0.6 m/s is given regardless of the depth and location in the pen.

(Case 02) The flow speed does not change in the depth direction, but is made slower toward the center such that the angular velocity remains constant at ω=0.15.

(Case 03) A flow speed that gives a flow speed only to the part of a truncated cone in which the fish are present at a high density is set to 0.6 m/s as in Case 1, the truncated cone having an empty center.

<Propulsive Force, Water Resistance>

The swimming force of the fish itself is called the propulsive force, and the force received from the water against the movement is called the resistance force. The propulsive force and the resistance force $F_{i,spp}$ received by the i-th fish are expressed as follows using constants k and β.

$$F_{i,spp} = kv_i - k\beta v_i^2 v_i \quad [\text{Math. 9}]$$

The first term on the right side represents the propulsive force. The propulsive force is a force of further accelerating in the direction of travel. The second term on the right side represents the resistance force. The resistance force is in the form of receiving a decelerating force in the opposite direction to the direction of travel. For example, the constant k is 0.05 and the constant β is 1.0.

<Initial Arrangement>

It is known that if a simulation is performed from a state in which multiple fish are circling, the circling behavior can be continued for a longer period of time. In view of this, the simulation is started from a state in which a plurality of fish are arranged in a donut shape in a range from 0.5 m to 3.5 m from the bottom of the pen and are caused to circle at an angular velocity of 0.1.

<Phototropism>

When observing fish in an actual pen, the fish are concentrated in the lower part of the pen. It is also known that many fish exhibit phototropism, in which they tend to move away from light sources. In view of this, phototropism is expressed by giving a downward force $F_{photo}$ to the force acting on the fish. Basically, as the depth z increases (as the sea surface is approached), the vertically downward force $F_{photo}$ increases. $F_{photo}$ is represented, for example, as one of the following. Here, it is assumed that z=0 at the bottom of the pen.

$$F_{photo} = -(0.1 \times \exp(0.1 \times (z - 0.1)) - 0.1) \quad \text{[Math. 10]}$$

$$F_{photo} = -(0.1 \times \exp(0.2 \times (z - 0.1)) - 0.1)$$

$$F_{photo} = \begin{cases} -(z - 0.55) \times z^2 \times (-0.25) & (z > 2) \\ 0 & (z \leq 2) \end{cases}$$

The first and second formulas reflect the exponential decay of light with depth. The second formula has a higher value in the upper layer than the first formula. The third formula is adjusted to be 0 in the range up to 2 m from the bottom, assuming that phototropism disappears at a certain depth (brightness). In calculating the fish position, the force $F_{photo}$ need not be given.

<Speed Near Bottom of Pen>

It is thought that fish tend to gather at the bottom due to the condition of phototropism, but they decelerate when they get too close to the bottom surface. In view of this, the speed of the fish may be reduced according to the distance from the bottom surface. Also, when the position of the fish actually exceeds the bottom surface, for example, it is moved from the bottom surface to a contrasting position.

<Force From Walls (Boundaries)>

Since fish are highly concentrated in the pen, a force of pushing against the walls constantly acts on the fish closest to the walls from the closest individuals, but the fish closest to the walls resist this force so as not to collide with the walls. In this state, it can be said that a force directed from the wall toward the center of the pen is received. Next, giving consideration to a fish at a second position from the wall, if this fish also tries to move toward the wall, it will be forced to resist the force directed from the wall toward the center because there is a fish at a first position from the wall, which is located between this fish and the wall. In other words, the second fish also receives the force directed toward the center from the simulated wall. However, since this simulated wall (the first fish from the wall) has a slightly larger range of motion than the actual wall, the force directed toward the center, which is received by the second fish, is thought to be weaker than the force received by the first fish. Similarly, the third fish from the wall and onward are also thought to receive a gradually weakening force toward the center. In view of this, it is assumed that the closer to the wall (the farther from the center) the fish is, the stronger the force toward the center of the pen is. Here, for example, the force $F_{wall}$ from the wall is given as in Case 11 to Case 14 below. It is also assumed that the force $F_{wall}$ from the wall does not change in the depth direction. The force $F_{wall}$ from the wall does not need to be applied.

(Case 11) A fish receives a force proportional to the fourth power of the distance re from the center.

$$F_{wall} = 0.01 \times r_c^4 \quad \text{[Math. 11]}$$

(Case 12) The fish receives the sum of the forces directed from the walls toward the center for all walls, the forces being attenuated in proportion to the distances $r_w$ from the walls.

$$F_{wall} = \sum \frac{F_{boundary}}{r_w} \quad \text{[Math. 12]}$$

Here, $F_{boundary}$ is the force from the wall toward the center and has an absolute value of 0.43.

(Case 13) Similarly to Case 12, the fish receives a force that attenuates according to the distance $r_w$ from the wall, but the force strongly attenuates as the distance from the wall increases.

$$F_{wall} = \sum \frac{F_{boundary}}{r_w^7} \quad \text{[Math. 13]}$$

Here, the absolute value of $F_{boundary}$ is 0.35.

(Case 14) Similarly to Case 11 and Case 12, the fish receives a force that attenuates according to the distance $r_w$ from the wall, but the force is further attenuated according to the distance from the center.

$$F_{wall} = \sum \frac{F_{boundary}}{r_w \times (7 - r_C)^{2.3}} \quad \text{[Math. 14]}$$

Here, the absolute value of $F_{boundary}$ is 0.78.

<Field-of-View Angle, Angle by which Direction Change is Possible>

Since it is thought that fish cannot see behind themselves, their field-of-view angles are assumed to be, for example, 180°, 270°, or 360°. If the field-of-view angle is less than 360°, the fish outside the field of view are not recognized, and therefore the attractive force, repulsive force, and alignment force do not act with respect to these fish.

In addition, considering that there is a limit to the angle by which the fish can change direction in one second, this angle is given as, for example, 20°, 30°, 40°, 50°, or 60°. For example, even if a fish tries to change its direction at a sharp angle due to the influence of another individual or the like, the fish actually changes direction only up to the magnitude of the angle by which direction change is possible.

<Noise>

The noise is given, for example, according to four normal distributions with a mean of 0 and standard deviations of 0.0, 0.02, 0.1, and 1.0. If the mean is 0 and the standard deviation is 0.0, then there is no noise.

<Consideration of Intraspecific Rank>

It is known that some fish develop an intraspecific rank relationship influenced by body size and show aggressive behavior toward the same species over feeding sites. In aquaculture farms, behavior is observed in which the larger fish surface and feed more quickly, and therefore it is thought that although there is no clear intraspecific rank, fish with a larger body size are more likely to occupy an advantageous position. In view of this, first, in the following Cases 21 and 22, consideration is given to the intraspecific rank.

(Case 21) An individual with a low rank receives a repulsive force from an individual with a high rank, but an individual with a high rank does not receive a repulsive force from an individual with a low rank.

(Case 22) An individual with a low rank receives a strong repulsive force from an individual with a high rank, and an individual with a high rank receives a weak repulsive force from an individual with a low rank.

In Cases 21 and 22, it is assumed that the rank is in descending order of body length. The magnitude of the repulsive force is expressed by adjusting the constant $c_3$ relating to the repulsive force. Furthermore, in Case 21, if the difference in body length is small, it is thought that there is a possibility that there will be no difference in repulsive force due to the difference in rank, and it may be assumed that the difference in repulsive force will occur only when the ranks are separated by a certain extent. In Case 22, a repulsive force is given by the following method of Case 22a to Case 22c.

(Case 22a) Since the body length distribution in the actual pen is a normal distribution, $c_3$ is also given so as to follow the normal distribution.

(Case 22b) The fish are divided into five groups by body length, and each group is given a repulsive force of $c_3$=0.1, 0.2, 0.3, 0.4, or 0.5.

(Case 22c) A fish receives a repulsive force of $c_3$=0.3 from an individual 500 ranks above its own rank, a repulsive force of $c_3$=0.05 from an individual 500 ranks below its own rank, and a repulsive force of $c_3$=0.2 from other individuals.

The behavior (position) of each fish present within a predetermined range (pen) is numerically simulated based on the above-mentioned attractive force, alignment force, repulsive force, propulsive force, water resistance, light repulsion, pressure from the walls (boundaries), and the like. The number of fish is, for example, 100 to 10000. Also, each fish may be given a different size (body length). Since it is known that the body length distribution of fish in an actual pen follows a normal distribution, the body length of the fish may be given such that the distribution of the body length of each fish follows a normal distribution.

(Simulation Echo Image Generation Processing)
<Calculation of Echo Sound Pressure>

Here, the calculation of the echo sound pressure received by the fish finder in step S103 of the operation flow of FIG. 3 will be described. The fish finder 200 has a transmitter that transmits sound waves (including ultrasonic waves) and a receiver that receives the sound waves. The fish finder 200 transmits burst waves or PCWs (Pulsed Continuous Waves) from the transmitter underwater. Due to the directivity of the transmitter, the sensitivity differs depending on the direction from the transmitter.

FIG. 7 is a diagram showing an example of a fish finder and fish. As shown in FIG. 7, the fish finder 200 is installed at the water surface, and fish are moving in the water. Let $P_0$ be the sound pressure at a position 1 m away from the transmitter in the vertical direction (transmitting sound pressure: the magnitude of the transmitted sound wave (transmitting sound)). When the vertical direction is $\theta$=0 and the horizontal direction is $\theta$=90°, the sound pressure P at a position 1 m away from the transmitter in the $\theta$ direction is expressed as $D(\theta)P_0$. $D(\theta)$ is called a directivity function. $D(\theta)$ is maximized when $\theta$ is 0, for example. The sound wave transmitted from the transmitter is attenuated by spreading (diffusion attenuation or divergence attenuation) and being absorbed by seawater (absorption attenuation) in the process of propagating the sound wave to the position of the fish. The incident sound pressure of the sound wave incident on the fish (sound pressure at a position 1 m away from the fish) is denoted at $P_i$, and the sound pressure of the sound wave reflected from the fish (sound pressure at a position 1 m away from the fish) is denoted as $P_r$. The intensity of reflection in the fish is expressed by the target strength (Ts), which is the ratio between the intensity of the reflected wave and the intensity of the incident wave (square ratio in terms of sound pressure). The target strength Ts is expressed as $Ts=(P_r/P_i)^2$. The reflected wave is affected by the same attenuation and directivity as the incident wave and is received as an echo sound pressure P by the receiver of the fish finder. The time from when a sound wave is transmitted from the fish finder to when it is reflected by the fish and received by the fish finder depends (almost proportionally) on the distance from the fish finder to the fish.

The echo sound pressure P when the sound wave transmitted from the transmitter is reflected by a fish located at a distance r in the $\theta$ direction as seen from the transmitter and is received by the receiver is calculated as follows.

$$P^2 = P_0^2 D(\theta) \frac{1}{r^4 10^{0.2\alpha r}} Ts \qquad \text{[Math. 15]}$$

In this formula, the echo sound pressure P depends on the target strength Ts and the distance r to the fish. Here, $\alpha$ is an absorption coefficient, which is expressed as follows based on Thorp's formula.

$$\alpha = f^2 \left[ 3.01 \times 10^{-4} + \frac{43.7}{4100 + f^2} + \frac{0.109}{1 + f^2} \right] \qquad \text{[Math. 16]}$$

Here, f is the frequency of the sound waves transmitted from the transmitter. Ts in the formula for the echo sound pressure P is a linear quantity.

<Target Strength Ts>

Here, calculation of the target length Ts will be described. Here, in order to calculate the Ts of the fish, scattering due to the swimbladders of the fish (bladder scattering model) and scattering due to the bodies of the fish (fish body scattering model) are considered.

As the swimbladder scattering model, Clay's Kirchhoff-acoustic ray approximation-gas-cylinder model is modified into a short-cylinder composite model, and acoustic ray theory is incorporated. A similar short-cylinder composite model for fluids is used as the fish body scattering model. The results of these two models are coherently summed (complex scattering amplitudes are added together) to obtain the overall model. The swimbladder and fish body are approximated by compositing short cylinders, and the scattered waves from each short cylinder are added together. Here, xyz coordinates fixed to the fish, a u coordinate parallel to the wavefront of the incident sound waves at an angle $\theta$ to x, and a v coordinate orthogonal to the u coordinate are introduced. Here, the u coordinate and the v coordinate are expressed as u=x sin $\theta$−z cos $\theta$ and v=x cos $\theta$+z sin $\theta$.

FIGS. 8 and 9 are diagrams showing examples of xyz coordinates fixed to fish and uv coordinates. The x coordinate is taken in the direction of the body axis of the fish, that is, from the head to the rear of the fish. The y coordinate is taken from left to right of the fish. In FIG. 8, the direction of the y coordinate is the direction from the front surface to the back surface of the paper. The z coordinate is taken from the bottom to the top of the fish. In FIG. 9, the direction of the z coordinate is the direction from the back surface to the front surface of the paper. Here, the fish is divided into equal intervals ($\Delta x$) along the x coordinate from the head side of the fish, the x coordinate of the head side of the j-th part of the fish body is x(j), and the z coordinate on the upper side of the head side of the j-th part of the fish body is zU(j), and the z coordinate on the lower side is zL(j). Also, w(j) is the body width of the head side of the j-th part of the fish body. Also, vU(j) and vL(j) are the v coordinates corresponding to zU(j) and zL(j), respectively. Here, it is assumed that the fish body and swimbladder are approximated using a plurality of cylinders (short cylinders) with a height of x that are arranged with their central axes parallel in the x direction.

The u-direction component Δu(j) of the length and the radius a(j) of the j-th short cylinder are respectively expressed as Δu(j) (≡Δuj)=(x(j+1)−x(j))sin θ and a(j)(≡aj)=(w(j)+w(j+1))/4.

FIG. 10 is a diagram showing an example of reflection and transmission of sound waves in a fish body and an example of reflection and transmission in a swimbladder. $R_{bs}$ is the reflectance between a fish body (b) and a swimbladder (s), $R_{wb}$ is the reflectance between surrounding water (w) and the fish body, and $R_{bw}$ is the reflectance between the fish body and the surrounding water. Also, $T_{wb}$ indicates the transmittance between the surrounding water and the fish body, and $T_{bw}$ indicates the transmittance between the fish body and the surrounding water. The relationship $T_{wb}T_{bw}=1-R_{wb}^2$ exists between the reflectance and the transmittance.

The scattering amplitude $A_{ss}$ by the swimbladder is obtained as follows by adding the transmission and reflection of the sound waves in the swimbladder to the short-cylinder composite model obtained based on the Kirchhoff approximation of a finite cylinder.

[Math.17]

$$A_{ss} = \frac{-iR_{bs}(1-R_{wb}^2)}{2\sqrt{\pi}} \sum_{j=1}^{N_s} A_j[(k_b a_j + 1)\sin\theta]^{1/2} \exp[-i(2k_b v_j + \psi_{sj})]\Delta u_j$$

$$R_{bs} = \frac{\rho_s c_s - \rho_b c_b}{\rho_s c_s + \rho_b c_b}, \quad R_{wb} = \frac{\rho_b c_b - \rho_w c_w}{\rho_b c_b + \rho_w c_w}$$

$$A_j \approx \frac{ka_j}{ka_j + 0.083}, \quad \psi_{sj} = \frac{ka_j}{ka_j + 40} - 1.05$$

$$v_j = [v_{sU}(j) + v_{sU}(j+1)]/2$$

$$k_b = \frac{2\pi f}{c_b} \quad \text{[Math. 18]}$$

Here, $N_s$ is the division number of the swimbladder, $k_b$ is the radius of the swimbladder, $c_w$ is the speed of sound in seawater, $c_b$ is the speed of sound in the fish body, and $c_s$ is the speed of sound in the swimbladder. Also, $\rho_w$ is the density of sea water, $\rho_b$ is the density of the fish body, and $\rho_s$ is the density of the swimbladder. $A_j$ and $\psi_{sj}$ are amplitude and phase correction terms, respectively, when ka is small.

Also, the scattering amplitude $A_{sb}$ by the fish body is obtained as follows, in the same way as for the swimbladder.

[Math. 19]

$$A_{sb} = \frac{-iR_{wb}}{2\sqrt{\pi}} \sum_{j=1}^{N_b} \sqrt{ka_j} \Delta u_j \times$$

$$\{\exp(-i2kv_{Uj}) - (1 - R_{wb}^2)\exp[-i2kv_{Uj} + i2k_b(v_{Uj} - v_{Lj}) + i\psi_{bj}]\}$$

$$\psi_{bj} = \frac{-\pi k_b v_{Uj}}{2(k_b v_{Uj} + 0.4)}$$

Here, $N_b$ is the division number of the fish body.

From the above, the target length Ts is calculated as Ts=$(A_{ss})^2+(A_{sb})^2$ using the scattering amplitude $A_{ss}$ by the swimbladder and the scattering amplitude $A_{sb}$ by the fish body.

<Simulation Echo Image Generation>

Here, generation of a simulation echo image in step S104 of the operation flow of FIG. 3 will be described. The simulation echo image is an image simulating an echo image generated based on the sound pressure (echo sound pressure) of the sound waves received as the reflected waves of the sound waves transmitted into the pen by a fish finder installed at a predetermined position (sea surface) of the pen where a plurality of fish are present. The sound waves transmitted from the fish finder are, for example, continuous waves of sound waves of 100 kHz modulated with a pulse of 1 ms. The emission frequency of sound waves transmitted from the fish finder is, for example, 800 times/minute.

It is assumed that the fish finder is placed at a predetermined position at the sea surface of the pen when the simulation echo image is generated. The position of the fish finder is, for example, a position that is 1.5 m horizontally and 1.5 m vertically spaced apart from the center of the pen (10 m wide, 10 m long, and 8 m deep), as shown in FIG. 4. The inside of the pen is divided by a predetermined distance Or (for example, Δr=10 cm) from the position of the fish finder, and the echo sound pressure for each fish present at a position located r to r+Δr from the fish finder is calculated. r is moved by Δr from 0 to the distance of the boundary of the pen. The echo sound pressure of each fish is calculated based on the distance between the fish finder and the fish and the target strength. By adding together the echo sound pressures from the fish present at a distance r to r+Δr from the fish finder, an echo sound pressure at a distance r to r+Δr from the fish finder is calculated. In addition, by moving r by Or from 0 to the distance of the boundary of the pen, it is possible to calculate the echo sound pressures from all the fish in the pen. The position of each fish at each time is calculated through numerical simulation of the positions of the fish. The target strength of each fish is also calculated through numerical simulation. In addition, the echo sound pressure is calculated at predetermined time intervals by simulating sound waves being transmitted from the fish finder at predetermined time intervals. The echo image generated by the fish finder is an image in which the sound pressures (echo sound pressure) of the sound waves received by the fish finder are represented by the shade of color, with the time when the sound waves were transmitted on the horizontal axis and the distance (depth) from the fish finder on the vertical axis. The distance from the fish finder corresponds to the time between transmitting and receiving the sound waves. Similarly, the simulation echo image is generated as an image in which the echo sound pressure at each time and each distance is represented by the shade of color or the like. Fish finders have stronger directivity in the vertical direction. Therefore, the installation position of the fish finder is preferably a position where more fish are present directly below (in the vertical direction of) the fish finder such that strong echo sound pressures from more fish can be received. This is because when the fish finder is installed at a position where there are few fish directly below, there is little difference between echo images obtained when there are many fish in the pen and when there are few fish. The installation position of the fish finder may also be a position at the water surface where it is calculated that there is a high probability that fish are present directly below (the number of fish is large) through numerical simulation of fish behavior in the pen.

FIG. 11 is a diagram showing an example of a generated simulation echo image. In the echo image of FIG. 11, the horizontal axis indicates time, and the vertical axis indicates distance from the fish finder. The time on the horizontal axis corresponds to the time when the fish finder transmitted the sound waves. In addition, the shade of color indicates the echo sound pressure at each distance and at each time. Closer to the bottom of the pen, the echo sound pressure is higher (there are more fish). Also, the intensity of the echo sound pressure changes as the fish move.

<Others>

Numerical simulation of fish behavior and generation of simulation echo images may also be performed by a device other than the fish count calculation apparatus 100. At this time, the processor 101 of the fish count calculation apparatus 100 acquires the simulation echo image from the other device that generated the simulation echo image through numerical simulation, via the communication control device 106, a network, or the like.

Actions and Effects of Embodiment

The fish count calculation apparatus 100 calculates the behavior (change in position over time) of fish present in a predetermined range (an underwater space such as a pen) through numerical simulation, based on the number of fish present in the predetermined range, the sizes of the fish, the size of the predetermined range, the forces acting on the fish, the flow speed of seawater, and the like. Also, the fish count calculation apparatus 100 generates a simulation echo image that simulates an echo image generated by a fish finder based on the behavior of fish in a predetermined range calculated through numerical simulation. The fish count calculation apparatus 100 calculates the behavior of the fish while changing the number of fish and the sizes of the fish, and generates simulation echo images for various numbers and sizes of fish. The fish count calculation apparatus 100 constructs an estimator that estimates the number of fish and the size of fish based on an echo image, using, as training data, a set of a simulation echo image, and the number and sizes of the fish. According to the fish count calculation apparatus 100, the behavior of the fish is calculated through numerical simulation for various numbers of fish, and the like, and by generating more simulation echo images, it is possible to create a greater amount of training data for echo images compared to when only echo images generated by an actual fish finder are used. According to the fish count calculation apparatus 100, by constructing an estimator using a larger amount of teacher data, it is possible to more accurately calculate the number of fish and the sizes of the fish (the number of fish for each class of fish size, etc.) in a pen with an unknown number of fish.

Although the embodiments of the present invention have been described above, these are merely examples, and the present invention is not limited thereto, and can be modified in various ways based on knowledge of a person skilled in the art, without departing from the spirit of the claims. In addition, each configuration example and the like can be implemented in combination to the extent possible.

<Computer-Readable Recording Medium>

A program that causes a computer or other machine or device (hereinafter referred to as a computer or the like) to realize any of the functions described above can be recorded on a recording medium readable by the computer or the like. By causing the computer or the like to load and execute the program of this recording medium, the function can be provided.

Here, a recording medium readable by a computer or the like is a recording medium that stores information such as data and programs by electrical, magnetic, optical, mechanical, or chemical action and can be read by a computer or the like. Elements constituting a computer such as a CPU and memory may be provided in such a recording medium, and the CPU may be caused to execute the program.

Examples of such a recording medium that can be removed from a computer or the like include flexible disks, magneto-optical disks, CD-ROMs, CD-R/Ws, DVDs, DATs, 8-mm tapes, memory cards, and the like.

In addition, hard disks, ROMs, and the like are examples of recording media fixed to computers and the like.

The invention claimed is:

1. A fish count calculation method, comprising:
constructing, by a computer, an estimator for estimating a number of fish present in a pen through machine learning using, as training data, a plurality of training data sets, each of which includes a training echo image based on sound waves received upon being reflected by the fish traveling within the pen when sound waves are transmitted in the pen, and the number of fish present in the pen in the training echo image; and
calculating, by the computer, an unknown number of fish present in a real pen by using the estimator on a real echo image generated based on sound waves that are transmitted in the real pen and received upon being reflected by the unknown number of fish present in the real pen,
wherein a plurality of training echo images included in the plurality of training datasets include a simulated echo image generated using numerical simulation of fish behavior, the numerical simulation generating sound waves reflected from a predetermined number of fish traveling in a school within the pen.

2. The fish count calculation method according to claim 1, further comprising:
calculating, by the computer, using the numerical simulation, sound waves when the predetermined number of fish reflect sound waves transmitted from a simulated fish finder into the pen; and
generating, by the computer, the simulated echo image based on echo sound pressure for each distance from the fish finder to the fish.

3. The fish count calculation method according to claim 2, further comprising: calculating, by the computer, in the numerical simulation, the behavior of the fish in the pen with a motion equation for each fish, by using, as parameters for the fish present in the pen, at least a size of the fish, a force acting on the fish, a field-of-view angle of the fish, a size of the pen, and a flow speed of a fluid in the pen.

4. The fish count calculation method according to claim 3, wherein the force acting on the fish includes an alignment force that acts between two individual fish within the school.

5. The fish count calculation method according to claim 3, wherein the force acting on the fish includes a downward force based on phototropism causing the fish to move away from a light source.

6. The fish count calculation method according to claim 3, wherein the force acting on the fish includes a force directed toward a center of the pen, wherein the force directed toward a center of the pen increases as the fish approaches the wall of the pen.

7. The fish count calculation method according to claim 3, wherein in the numerical simulation, the predetermined number of fish travel around inside of the pen in a shape of a truncated cone whose radius increases toward the bottom.

8. The fish count calculation method according to claim 1, wherein:
- the fish present in the pen are classified into two or more classes of fish sizes;
- the estimator has learned to be able to estimate the number of fish present in the pen for each class, through machine learning using the plurality of training data sets; and
- the computer uses the estimator to calculate the number of fish present in the real pen for each class, with respect to the real echo image.

9. A non-transitory computer-readable storage medium storing a program for causing a computer to:
- construct an estimator for estimating a number of fish present in a pen through machine learning using, as training data, a plurality of training data sets, each of which includes a training echo image based on sound waves received upon being reflected by the fish when sound waves are transmitted in the pen in which the fish travel within the pen, and the number of fish present in the pen in the training echo image; and
- calculate an unknown number of fish present in a real pen by using the estimator on a real echo image generated based on sound waves that are transmitted in the real pen and received upon being reflected by the unknown number of fish present in the real pen,
- wherein a plurality of training echo images included in the plurality of training datasets include a simulated echo image generated using numerical simulation of fish behavior, the numerical simulation generating sound waves reflected from a predetermined number of fish traveling in a school within the pen.

10. A fish count calculation apparatus, comprising:
a processor configured to:
construct an estimator for estimating a number of fish present in a pen through machine learning using, as training data, a plurality of training data sets, each of which includes a training echo image based on sound waves received upon being reflected by the fish when sound waves are transmitted in the pen in which the fish travel within the pen, and the number of fish present in the pen in the training echo image; and
calculate an unknown number of fish present in a real pen by using the estimator on a real echo image generated based on sound waves that are transmitted in the real pen and received upon being reflected by the unknown number of fish present in the real pen,
wherein a plurality of training echo images included in the plurality of training datasets include a simulated echo image generated using numerical simulation of fish behavior, the numerical simulation generating sound waves reflected from a predetermined number of fish traveling in a school within the pen.

* * * * *